Figure 5:
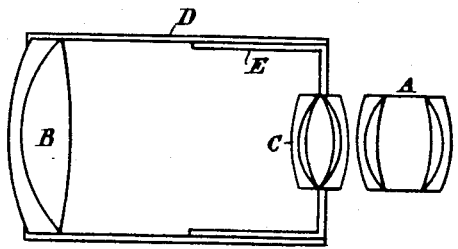

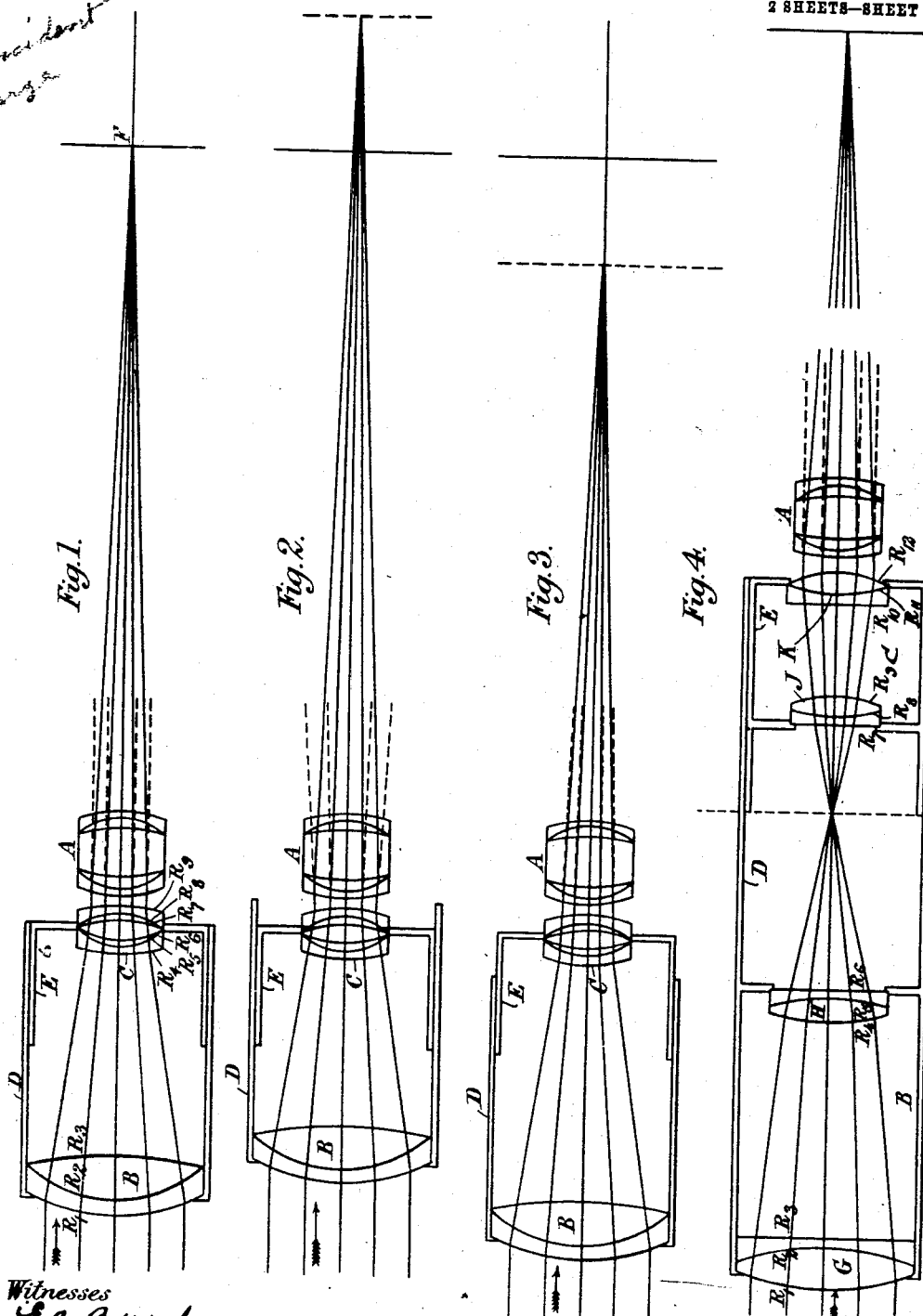

No. 756,779. PATENTED APR. 5, 1904.
T. R. DALLMEYER.
PHOTOGRAPHIC LENS.
APPLICATION FILED DEC. 18, 1899.
NO MODEL. 2 SHEETS—SHEET 2.

UNITED STATES PATENT OFFICE.

THOMAS RUDOLPHUS DALLMEYER, OF MIDDLESEX, ENGLAND.

PHOTOGRAPHIC LENS.

SPECIFICATION forming part of Letters Patent No. 756,779, dated April 5, 1904.

Application filed December 18, 1899. Serial No. 740,776. (No model.)

*To all whom it may concern:*

Be it known that I, THOMAS RUDOLPHUS DALLMEYER, optician, a subject of the Queen of Great Britain, residing at 25 Newman street, Oxford street, in the county of Middlesex, England, have invented certain new and useful Improvements in Photographic Lenses, of which the following is a specification.

The object of this invention is to provide as an adjunct to any ordinary photographic lens which is complete in itself an optical means of increasing the size of the image formed by the lens without necessarily diminishing the intensity of the illumination.

Throughout the specification I employ the term "lens" as including compound lenses or lens systems; but the term "system" excludes a single lens.

In all optical systems hitherto constructed for photographic purposes direct enlargement of the image has been brought about as follows:

A. By "primary" magnification, in which case a converging lens is combined with a diverging lens, forming what is known as a "telephotographic lens." The image is direct and inverted, its illumination being decreased in proportion to the area of the enlarged image as compared to that given by the converging lens alone—that is to say, as the square of the linear magnification.

B. By "secondary" magnification, in which the primary inverted image formed by an ordinary converging lens is subjected to enlargement by a second converging lens, reinverting the image and forming an erect enlarged image. Here again the illumination of the latter is decreased in proportion to the square of the linear magnification.

In both cases it has hitherto been customary to employ a converging lens of given initial intensity as a basis for subsequent conversion into an enlarging system by the addition of a posterior enlarging system as described under paragraphs A or B, where the initial intensity of the converging lens rapidly diminishes with the degree of enlargement.

My invention consists in an adjunct or addition of an optical enlarging system to the anterior portion of any complete photographic lens, whereby, first, I avoid the proportionate loss of illumination in the enlarged image necessitated by the old methods; second, I may even maintain the initial intensity given by the converging lens alone at its focal plane when the enlargement is not great.

My present object in particular is to assist the user of the "hand-camera" and the smaller sizes of cameras to avoid "exaggerated" perspective by enabling the operator to be at a greater distance from the foreground of his subject and yet maintain a sufficiently large image, also to obtain by the addition of the enlarging system to his lens enlarged details in subjects of general interest included by the ordinary lens used alone, distant objects, &c. The invention may, nevertheless, be applied to any ordinary lens to attain the ends of a telephotographic system with greater mechanical convenience, the additional system to screw into the place of the "hood" of the lens.

Figure 6:
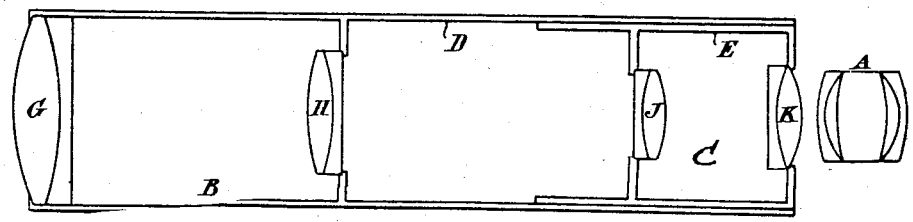

Figures 1, 2, and 3 are diagrams illustrating one way of carrying out my invention. Fig. 4 illustrates a modification. Figs. 5 and 6 show the combination of lenses without lines indicating the rays.

A is an ordinary photographic lens, and B and C are the lenses making up the enlarging system. B and C are mounted in tubes D and E, sliding one within the other, so that the distances apart of B and C can be varied, as shown in Figs. 1, 2, and 3. Fig. 4 is similarly constructed, but it has not been thought necessary to show more than one portion. The lens B should be of the highest intensity possible—that is to say, of the largest diameter and shortest focal length convenient, so that when combined with C for a given linear magnification the initial intensity of the lens A, to which it is added, may be maintained or, at any rate, diminished in a less degree than would be the case with any posterior attachment to the original converging lens A. The lens C should be of shorter focal length than that of the lens A, again maintaining the largest diameter and shortest focal length possible, so as to maintain in combination with B the initial intensity for a given linear magnification when this is feasible. The power of the diverging lens C, Figs. 1, 2, and 3, should preferably be equal to or greater than the sum of the powers of the converging lenses A and B. According to the degree of magnification required, I decide the ratio of the focal length of B to that of C. When the lenses B and C are placed at the normal separation—that is, at a distance equal to the difference of their focal lengths, as shown in Fig. 1—parallel rays incident upon B will after refraction at C emerge parallel. Now if we place this supplementary system in front of any ordinary lens A, which has been focused for parallel rays, (forming an image at F in its focal plane,) it is obvious that the addition of this system, which transmits parallel rays, will not alter the plane of the focus, but will increase the linear dimensions of the image in a ratio equal to the ratio of the focal lengths of B and C. If the effective diameter of the aperture of the lens B is greater than that of A, it is evident that the loss of illumination due to magnification may be compensated for partially or entirely. If the ratio of the effective diameters of B and A is equal to the ratio of the focal lengths of B and C, the illumination is identical. If less, the illumination is diminished, supposing always that the full pencil of rays incident upon B is transmitted by C, which can be accomplished. If the lenses composing the supplementary system are brought nearer together, as shown in Fig. 2, it becomes a system of variable diverging focal length, transmitting divergent rays from any object to the lens A, thus permitting a still more enlarged image to be received at F any distance beyond the focal plane of the lens A, depending upon the separation between B and C for the time being. If the lenses B and C are separated by any interval greater than the normal separation, as shown in Fig. 3, it is obvious that it becomes a system of variable converging focal length. Parallel incident rays upon the supplementary system now emerge convergent, causing the image to be received upon a plane nearer to the lens A than its focal plane. In this case it will be seen that the linear magnification will be less than the ratio of the focal lengths of B and C; but the illumination may be greater than that of the lens A used alone. With the lenses separated, as in Fig. 3, it is evident that any near object may transmit parallel rays to the lens A with an enlarged image at its focal plane.

It will be evident that near objects may be photographed with B and C arranged as shown in Fig. 2; but the plane of the image must be beyond the focal plane of the lens A.

The lenses B and C are each preferably aplanatic. The form ascribed to the lens B will determine that to be ascribed to C.

Figs. 1, 2, and 3 illustrate one of many forms convenient for carrying out the object of this invention. The details of the lenses are as follows: B is a cemented combination, diameter 1.5", being twice that of A or C.

$R_1 = 1.75"$, $R_2 = 1"$, $R_3 = 33"$; thickness .1" $\mu$ for D line 1.6202, $\mu$ for H$\gamma$ line 1.6428; thickness .35" 1.5170 1.5279

C is a symmetrical diverging combination with edges in contact. Diameter .75", equal to that of A. Focal length equals half that of B.

$R_4 = 2.947"$, $R_5 = .6"$, $R_6 = .925"$; thickness .075" 1.5170 1.5279; thickness .05" 1.6202 1.6428

$R_7 = .925"$, $R_8 = .6"$, $R_9 = 2.947"$; thickness .05" 1.6202 1.6428; thickness .075" 1.5170 1.5279

In the enlarging system illustrated in Fig. 4, B and C are both converging systems. If the image formed by the lens B, whether for parallel rays (as illustrated) or for a near object, (in which case B must be farther separated from C,) lie in the front focal plane of the lens C, then C will transmit parallel rays to the lens A, and hence the final enlarged image will be received upon the focal plane of A. The image may, however, be received upon any plane nearer to or farther from the lens A than its focal plane by an adjustment of the separation of B and C. If the image formed by B falls nearer to C than its focal plane, divergent rays will be transmitted to the lens A. If the image formed by B is farther removed from C than its focal plane, C will transmit convergent rays to the lens A. B and C are each preferably aplanatic. Each forms an image independently of the other, so that for this purpose B and C may be any two aplanatic systems whatsoever; but each should have the highest intensity attainable. The following are the particulars of the lenses in Fig. 4. B is composed of two cemented combinations G and H.

G, diameter 1.5":

$R_1 = 2."$, $R_2 = 2.48"$, $R_3 = \infty$; thickness .35" 1.5170 1.5279; thickness .1" 1.6202 1.6428

H, diameter 1.":

$R_4 = 1.55"$, $R_5 = 1.925"$, $R_6 = \infty$; thickness .2" 1.5170 1.5279; thickness .075" 1.6202 1.6428

Fixed separation from $R_3$ to $R_6$ = 2.1".

C is composed of two cemented combinations J and K.

J, diameter .75":

$R_7 = \infty$, $R_8 = .9625"$, $R_9 = .775"$; thickness .06" 1.5170 1.5279; thickness .2" 1.6202 1.6428

K, diameter .85":

$R_{10} = \infty$ } thickness .075" 1.5170 1.5279
$R_{11} = 1.24"$ } thickness .15" 1.6202 1.6428
$R_{12} = 1.$ Fixed separation from $R_7$ to $R_{10}$ = 1.05".

B is here twice the focal length of C and twice the diameter of A.

What I claim is—

1. The combination with an ordinary photographic lens complete in itself, of an enlarging system placed in front of it, and consisting of a front converging and a rear diverging lens.

2. The combination with an ordinary photographic lens complete in itself, of an enlarging system placed in front of it, and consisting of a front converging and a rear diverging lens, and means for varying the distance apart of these two lenses.

3. The combination with an ordinary photographic lens complete in itself, of an enlarging system placed in front of it, and consisting of a front converging and rear diverging lens, the system being such that parallel incident rays emerge parallel.

4. The combination with an ordinary photographic lens complete in itself, of an enlarging system placed in front of it, and consisting of a front converging and a rear diverging lens, and means for varying the distance apart of these two lenses, the system being such that parallel incident rays emerge parallel.

5. The combination with an ordinary photographic lens complete in itself, of an enlarging system placed in front of it, and consisting of a front converging and a rear diverging lens, the diameter of the converging lens being greater than those of the diverging and photographic lenses.

6. The combination with an ordinary photographic lens complete in itself, of an enlarging system placed in front of it, and consisting of a front converging and a rear diverging lens, and means for varying the distance apart of these two lenses, the diameter of the converging lens being greater than those of the diverging and photographic lenses.

7. The combination with an ordinary photographic lens complete in itself, of an enlarging system placed in front of it, and consisting of a front converging and a rear diverging lens, the system being such that parallel incident rays emerge parallel, the diameter of the converging lens being greater that those of the diverging and photographic lenses.

8. The combination with an ordinary photographic lens complete in itself, of an enlarging system placed in front of it, and consisting of a front converging and a rear diverging lens, and means for varying the distance apart of these two lenses, the system being such that parallel incident rays emerge parallel, the diameter of the converging lens being greater than those of the diverging and photographic lenses.

9. The combination with a photographic lens adapted to be focused as in the usual operation of a camera, of an adjustable enlarging system placed in front of it, and producing at will different degrees of magnification of the image.

10. An image-enlarging device consisting of a front converging lens, and a rear diverging lens mounted in a suitable tube or holder and adapted to be applied in front of the focusing-lens of an ordinary camera.

11. An image-enlarging device consisting of a front converging lens and a rear diverging lens mounted in a suitable holder, and adjustable, one with reference to the other, and adapted to be applied in front of the focusing-lens of an ordinary camera.

THOMAS RUDOLPHUS DALLMEYER.

Witnesses:
C. J. Crow,
G. Low.